United States Patent
Aksit et al.

(10) Patent No.: US 6,637,752 B2
(45) Date of Patent: Oct. 28, 2003

(54) SUPPLEMENTAL SEAL FOR THE CHORDAL HINGE SEAL IN A GAS TURBINE

(75) Inventors: Mahmut Faruk Aksit, Istanbul (TR); Ahmad Safi, Troy, NY (US); Abdul-Azeez Mohammed-Fakir, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,929

(22) Filed: Dec. 28, 2001

(65) Prior Publication Data

US 2003/0122316 A1 Jul. 3, 2003

(51) Int. Cl.[7] .................... F16J 15/08; F04D 29/44
(52) U.S. Cl. .................. 277/416; 277/545; 277/653; 415/135; 415/209.3
(58) Field of Search .................. 277/355, 416, 277/543, 545, 637, 650, 652; 415/189, 191, 209.2, 174.2, 174.3, 135, 209.3

(56) References Cited

U.S. PATENT DOCUMENTS

| | | | | |
|---|---|---|---|---|
| 4,314,793 A | * | 2/1982 | DeTolla et al. ............ 415/135 |
| 4,318,668 A | * | 3/1982 | Chaplin et al. ............ 415/135 |
| 4,645,217 A | * | 2/1987 | Honeycutt et al. .......... 277/555 |
| 4,863,343 A | * | 9/1989 | Smed ....................... 415/138 |
| 5,149,250 A | * | 9/1992 | Plemmons et al. .......... 415/209.3 |
| 5,372,476 A | * | 12/1994 | Hemmelgarn et al. ....... 415/135 |
| 5,474,306 A | * | 12/1995 | Bagepalli et al. ........... 277/355 |
| 5,509,669 A | * | 4/1996 | Wolfe et al. ............... 277/654 |
| 5,586,773 A | * | 12/1996 | Bagepalli et al. ........... 277/650 |
| 5,653,580 A | * | 8/1997 | Faulder et al. ............ 415/209.3 |
| 5,657,998 A | * | 8/1997 | Dinc et al. ................ 277/653 |
| 5,839,878 A | * | 11/1998 | Maier ....................... 415/209.2 |
| 5,915,697 A | * | 6/1999 | Bagepalli et al. ........... 277/627 |
| 5,934,687 A | * | 8/1999 | Bagepalli et al. ........... 277/637 |
| 6,162,014 A | * | 12/2000 | Bagepalli et al. ........... 415/170.1 |

* cited by examiner

Primary Examiner—Anthony Knight
Assistant Examiner—Alison K. Pickard
(74) Attorney, Agent, or Firm—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner rail of the nozzle segment on a high pressure side of the chordal hinge seal. The supplemental seal includes a pair of sheet metal shims overlaid by a woven metallic cloth supported by a bracket secured to the nozzle support ring. The radially outer end of the cloth seal bears against a back side of the inner rail. The shims of the legs of the supplemental seal are slit along their distal margin and staggered in a circumferential direction relative to one another to provide flexibility and effective sealing engagement with the inner rail.

18 Claims, 9 Drawing Sheets

US 6,637,752 B2

SUPPLEMENTAL SEAL FOR THE CHORDAL HINGE SEAL IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chordline of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal between the first-stage nozzle segments and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzle segments and the nozzle support ring which eliminates or minimizes leakage past the chordal hinge seals and which is readily and easily installed. In a preferred embodiment, the supplemental seal includes a plurality of arcuate seal segments each having at least one and preferably two back-to-back sheet metal shims wrapped in a woven metallic cloth and attached by a bracket to the nozzle support ring. The supplemental seal extends from the support ring generally radially outwardly for engagement against a surface of the nozzle segments remote from the chordal hinge seals. The high pressure compressor discharge air in the high pressure region of the turbine biases the cloth seal against the remote sealing surface, e.g., the inner rails of the nozzle segments.

Particularly, the cloth seal and shims are secured along an inner arcuate edge to an arcuate support bracket, the arcuate inner edge of the bracket being secured to the nozzle support ring. Each seal segment extends arcuately in a circumferential direction relative to the turbine axis and is provided in lengths at least corresponding to the circumferential extent of each inner rail and preferably in arcuate lengths of 90° or 180°. The supplemental seal segments thus overlie gaps between the segments.

The cloth and shims of each seal are shaped to project generally radially outwardly relative to the nozzle support ring. The shim portions in the arcuate distal leg of each seal segment are slit back from their distal edges to form a plurality of fingers. The fingers of one shim leg overlie the slits between the fingers of the other shim leg. That is, the slits of the shims are staggered in a circumferential direction relative to one another such that the slits of each shim leg are effectively sealed by the fingers of the opposing shim leg. The slits afford flexibility to the sealing surface of the supplemental seal leg.

In a preferred embodiment according to the present invention, there is provided a turbine comprising a turbine nozzle support ring having a generally axially facing first surface, a turbine nozzle segment having at least one stator vane and a radially inwardly extending inner rail having a second surface in axial opposition to the first surface, a seal extending from the turbine nozzle support ring for sealing engagement along a side surface of the inner rail remote from the second surface for sealing between the support ring and the nozzle segment, the seal including a seal segment having at least a first plate, an overlay of a woven metallic cloth and a distal margin covered by the cloth and engaging the remote side surface.

In a further preferred embodiment according to the present invention, there is provided a turbine comprising a turbine nozzle support ring having a generally axially facing first surface, a plurality of turbine nozzle segments each having at least one stator vane and a radially inwardly extending inner rail having a second surface in axial opposition to the first surface, a seal comprised of a plurality of seal segments extending from the nozzle support ring for sealing engagement along a side surface of the inner rail remote from the second surface, each seal segment including a first plate, an overlay of a woven metallic cloth and a distal margin covered by the cloth and engaging the remote side surface.

DETAILED DESCRIPTION OF THE INVENTION

Figure 1:
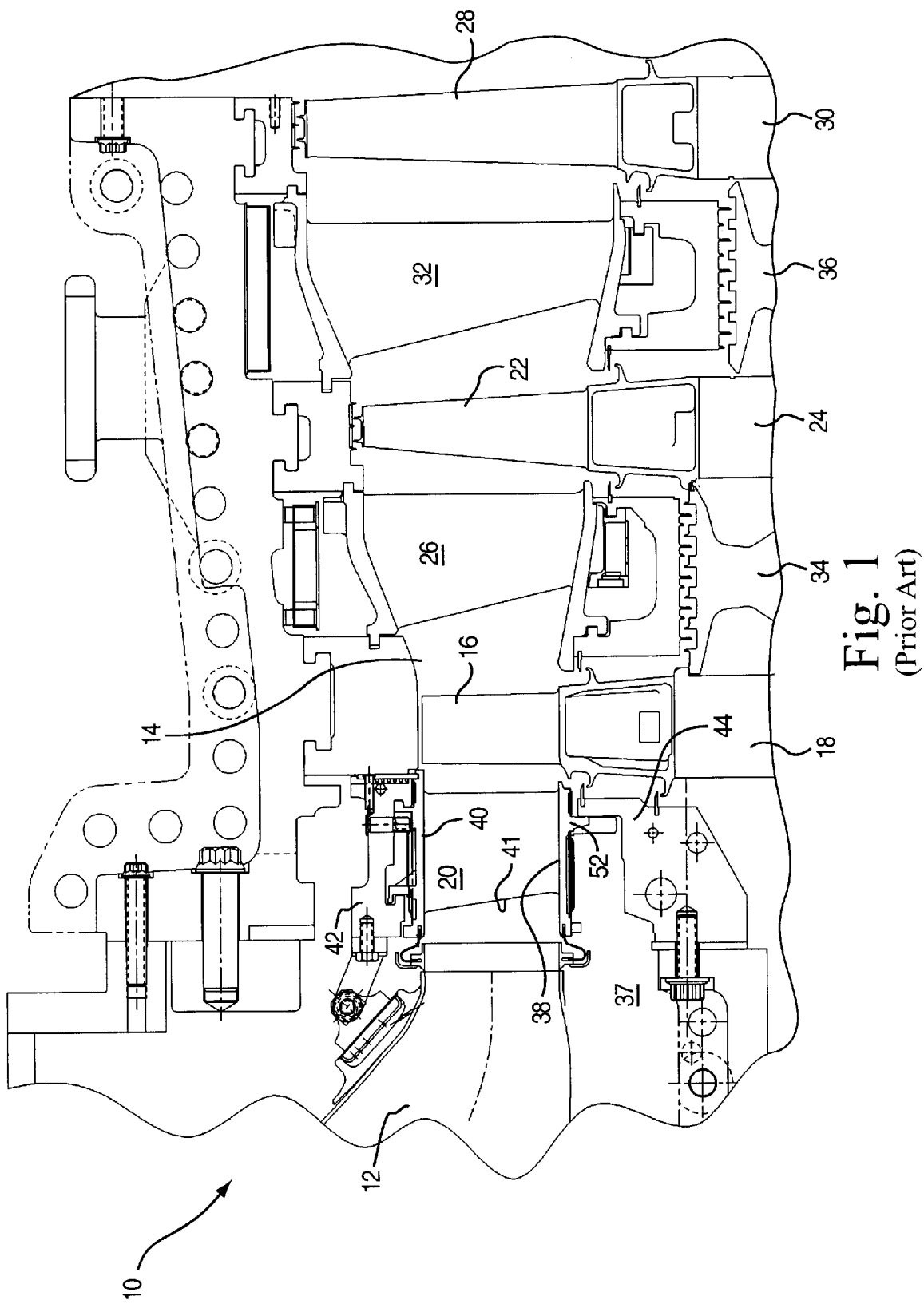
FIG. 1 is a fragmentary schematic side elevational view of a portion of a gas turbine.
Figure 2:
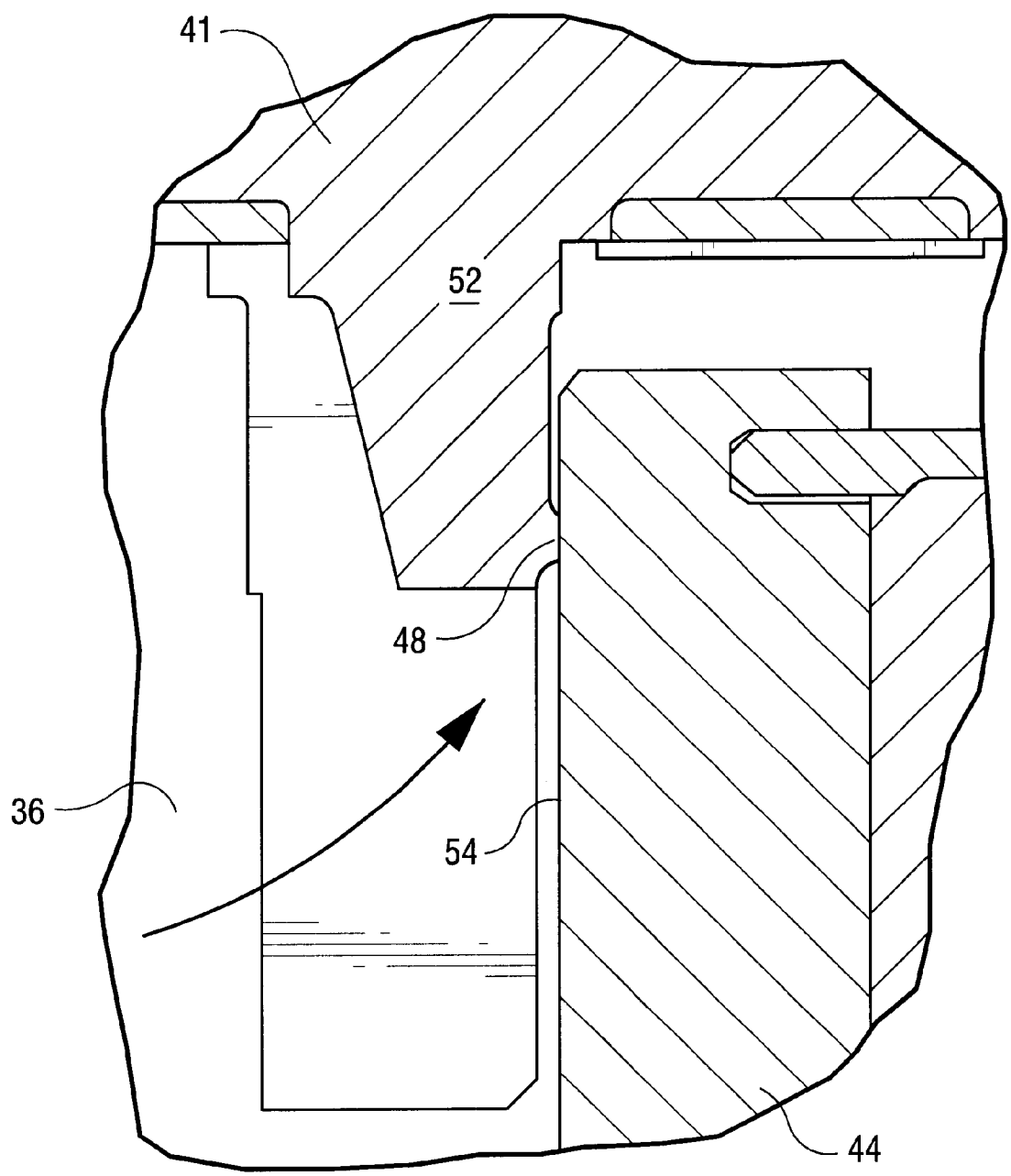
FIG. 2 is an enlarged fragmentary cross-sectional view illustrating a conventional chordal seal hinge.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 3:
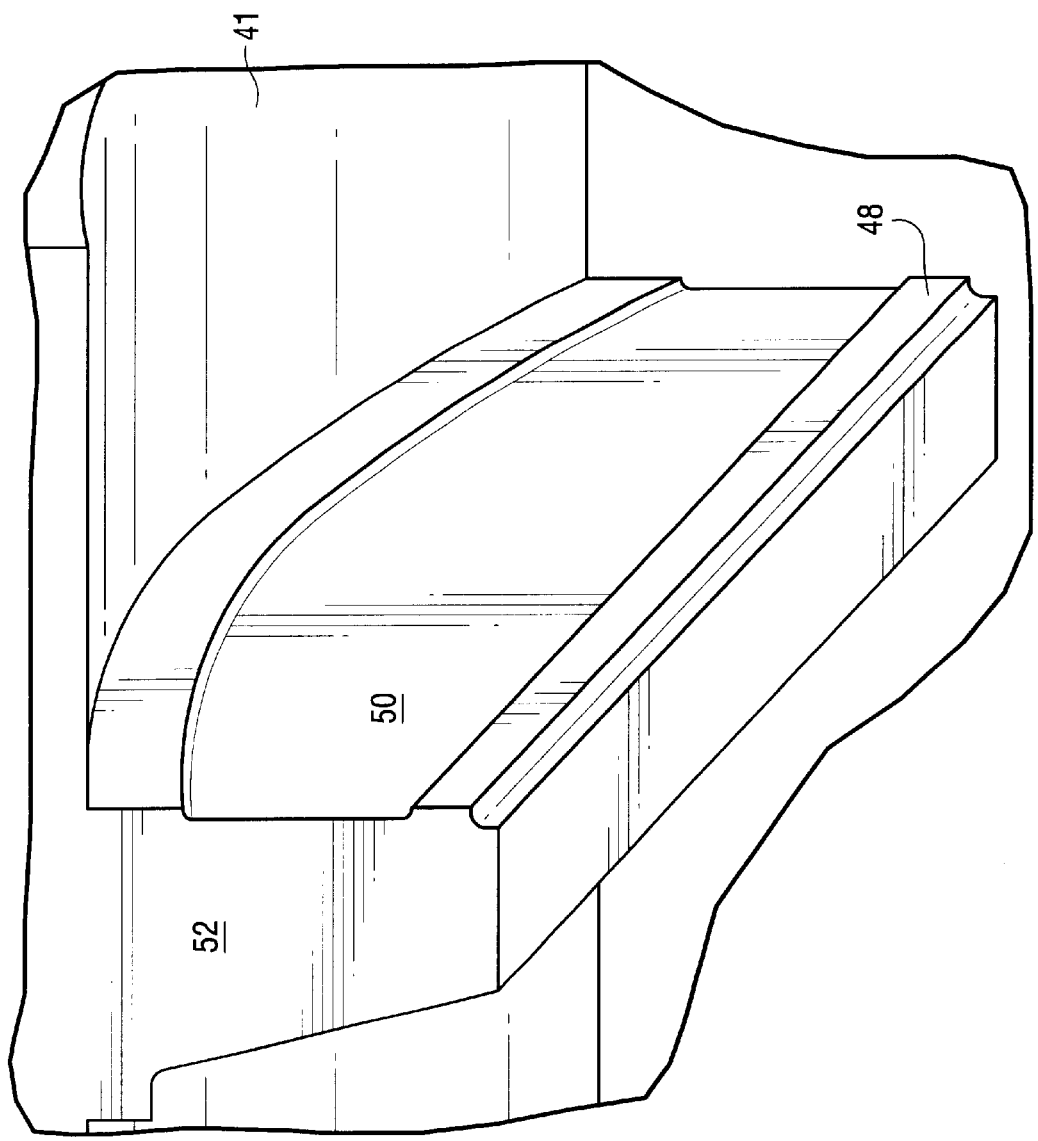
FIG. 3 is a fragmentary perspective view illustrating a portion of a conventional chordal hinge seal along an inner rail of a nozzle segment.
Figure 4:
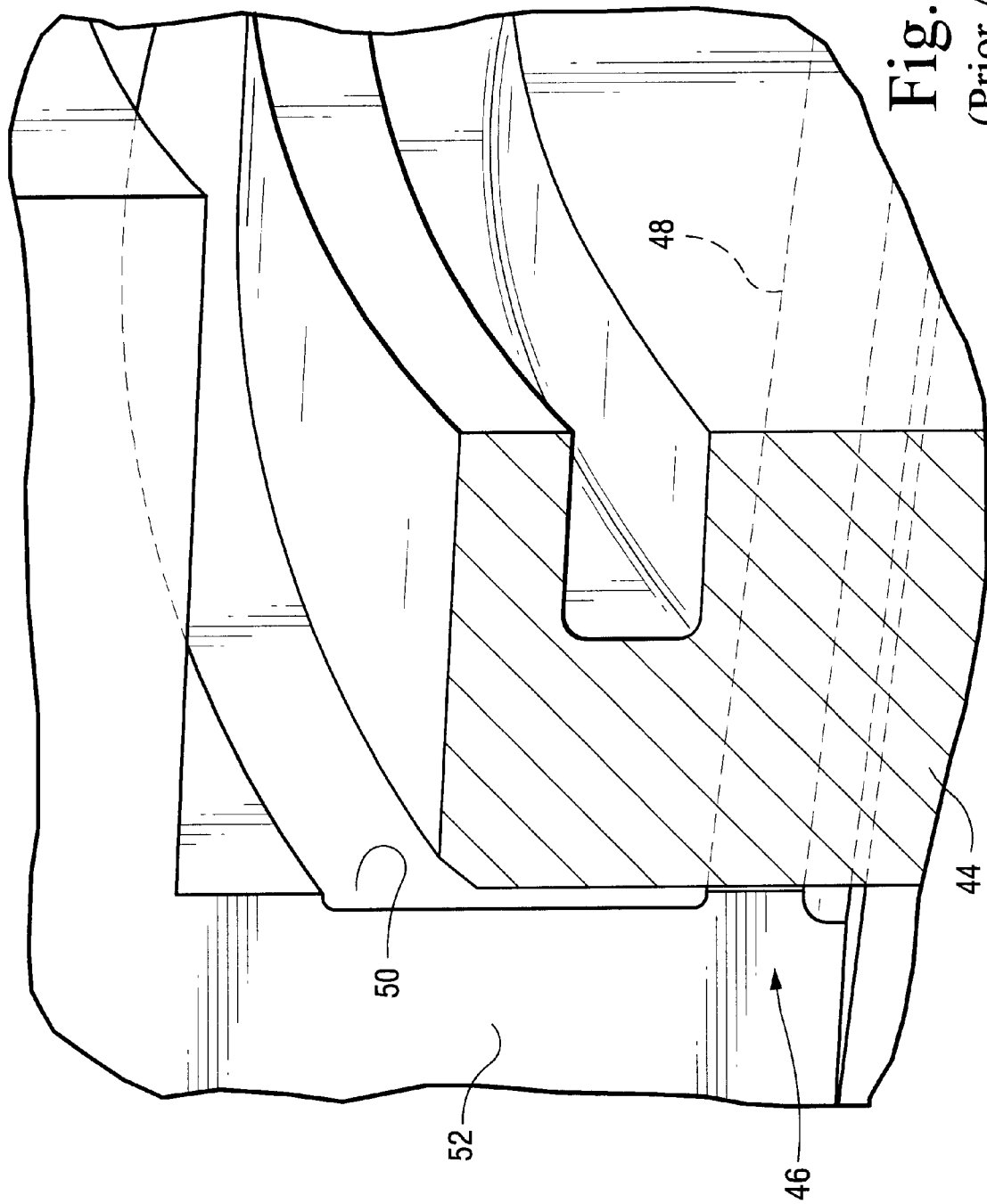
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIGS. 1 and 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52. The inner rail 52 includes a chord-wise, linearly extending axial projection 48, generally and collectively hereinafter referred to as a chordal hinge seal 46 (FIGS. 3 and 4. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 is thus intended to seal against leakage from the high pressure region 37 into the lower pressure region of the hot gas path 14.

Figure 5:
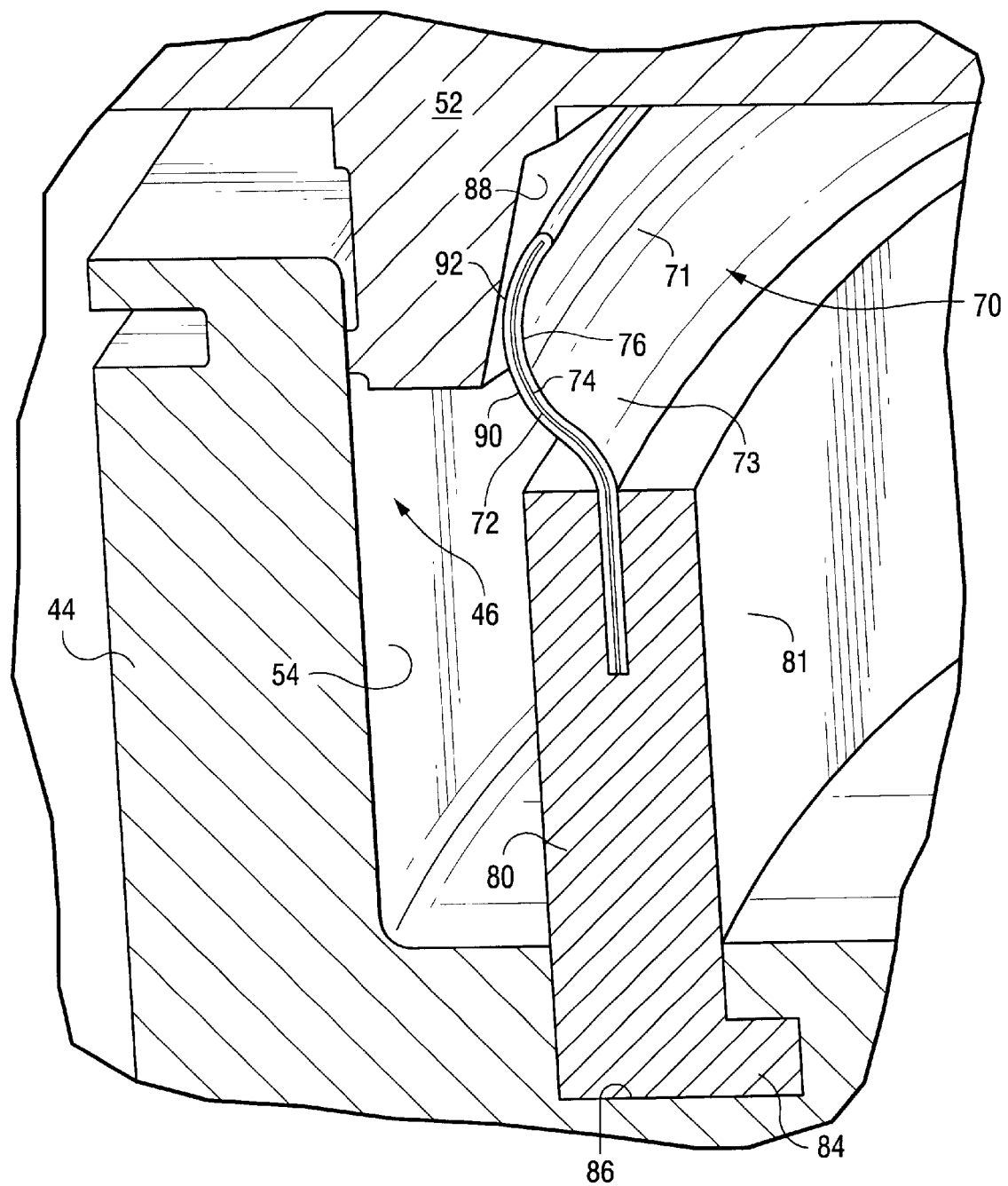
FIG. 5 is a fragmentary enlarged perspective view illustrating a supplemental seal according to a preferred embodiment of the present invention.
Figure 6:
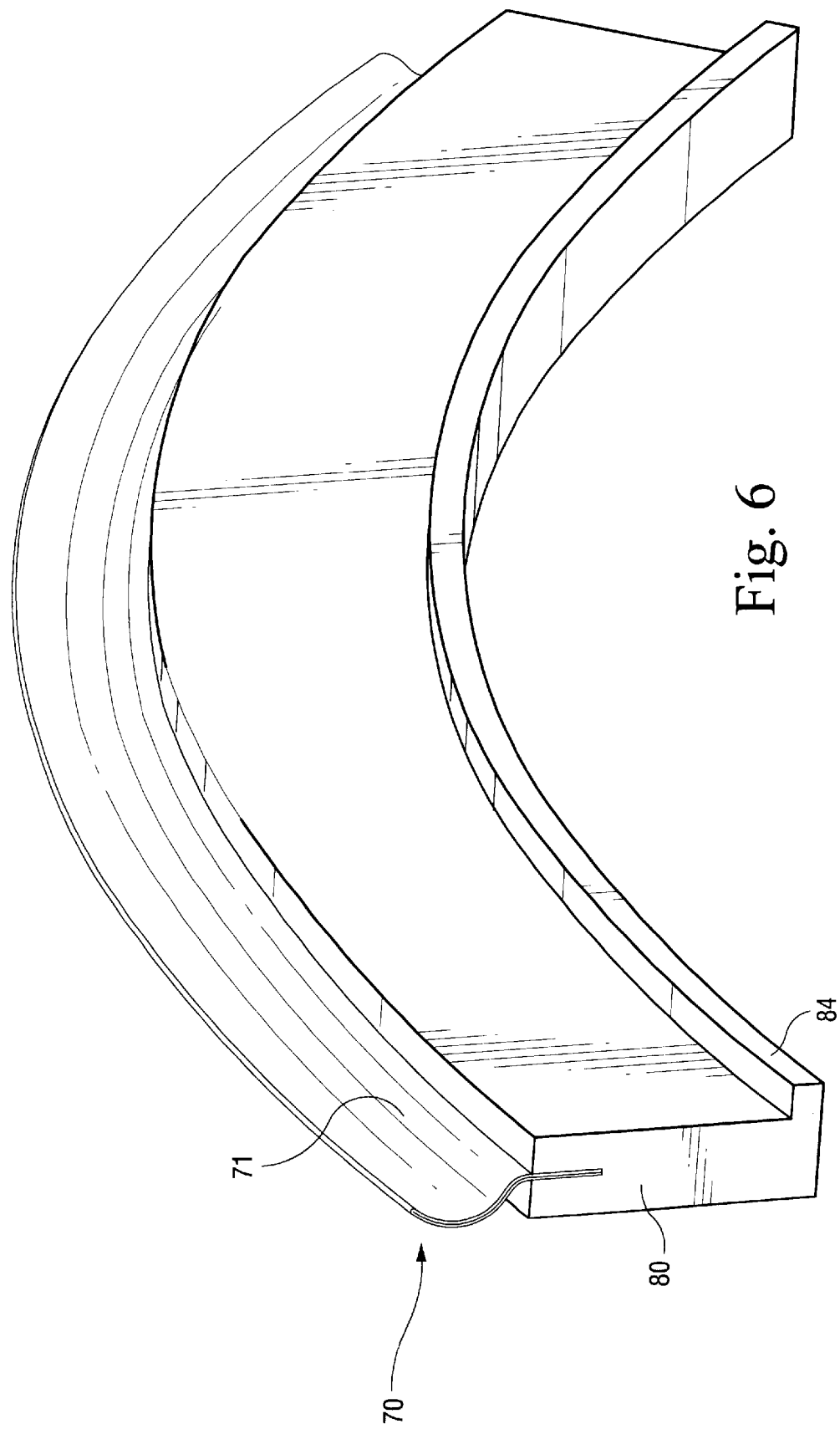
FIG. 6 is a perspective view of the bracket and seal hereof.

As noted previously, however, when operating the turbine, component parts of the nozzles and nozzle support ring will tend to form leakage gaps between the projections 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzle segments 41, particularly the inner rails 52, and the nozzle support ring 44. The supplemental seal, generally designated 70 (FIG. 5), is provided in circumferentially extending seal segments 73. Each segment 73 includes an arcuately extending cloth seal 71 formed by arcuately extending back-to-back sheet metal shims wrapped in preferably a woven metallic cloth and secured to the first-stage nozzle. Particularly, the circumferentially extending supplemental seal 70 includes one, and preferably a pair of sheet metal plates or shims 72 and 74 (FIG. 8) overlaid on both sides by a woven metallic cloth 76. Seal 70 also includes a structural, circumferentially extending support bracket 80 which extends radially outwardly from the nozzle support ring 44 and provides a rigid support for the seal. Bracket 80 may be formed in circumferential segments 81, preferably corresponding in length to the length of the seal segments 73. The metallic cloth and shims are integrally secured, e.g., by welding, to the bracket 80 along the radially outer margin of the bracket 80. The radial inner edge of each bracket segment 81 includes an axially extending flange 84. The outer surface of the support ring 44 includes a complementary shaped groove 86 for receiving the bracket segment 81.

The supplemental seal 70 is supported by bracket 80 and seals against a surface 88 of the inner rail 52 remote from the chordal hinge seal 46. The cloth seal 71 is shaped circumferentially and is arcuate in an axial direction to seal against remote surface 88.

Figure 7:
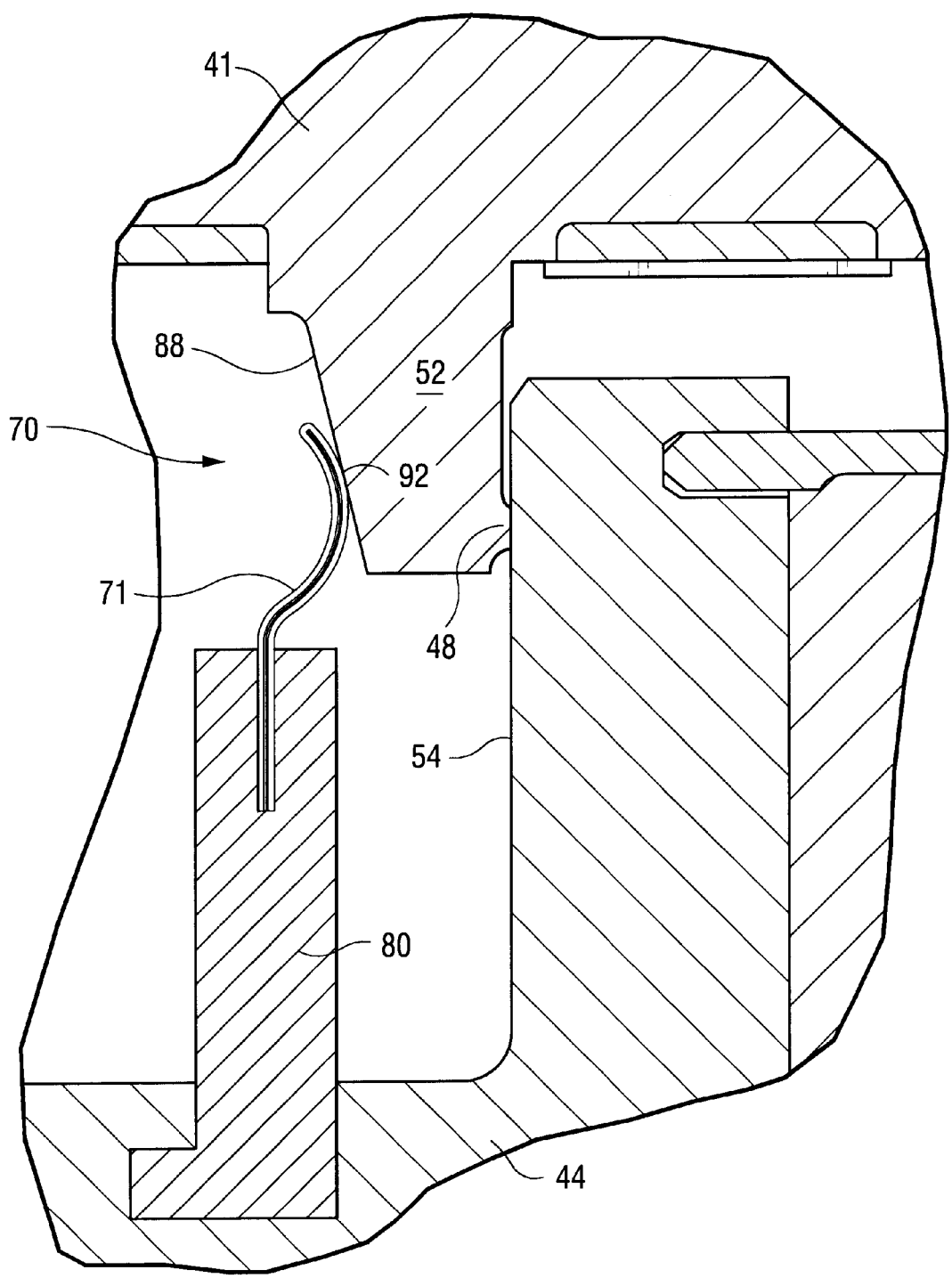
FIG. 7 is a side elevational view of the supplemental seal of FIG. 5 installed in conjunction with the chordal hinge seal.

Particularly, the distal margin of the seal 70 turns axially to form a leg portion 90 which seals against remote surface 88. That is, the cloth seal leg portion 90 is bent arcuately in an axial direction toward remote surface 88 and is biased or preloaded to form a generally circumferentially extending seal 92 (FIG. 7) along surface 88. The sealing leg portion 90 bears against the remote surface 88 with the woven metallic cloth in contact with the surface 88, effecting the supplemental seal hereof. It will be appreciated that the shims 72 and 74 (FIG. 8) are also preloaded to maintain the sealing leg portion 90 in sealing engagement against the surface 88.

Figure 8:
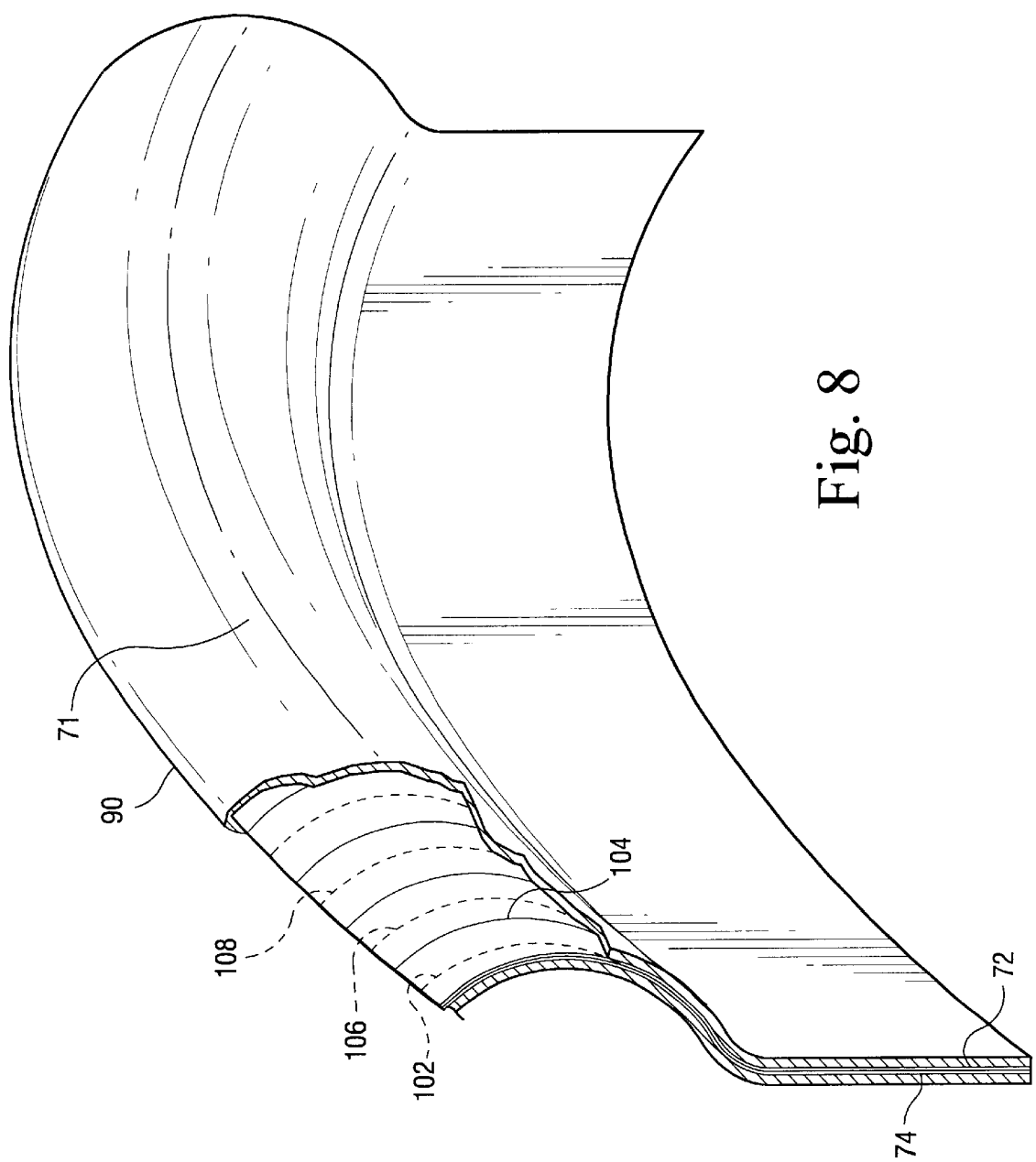
FIG. 8 is a fragmentary perspective view of the seal illustrating the interior construction of the sealing margin.

As best illustrated in FIG. 8, the shims 72 and 74 along the leg portion 90 are slit at laterally spaced locations along the seal 70 to form fingers 102 and 106, respectively. For example, the shim 72 is slit at 104 at circumferentially spaced locations therealong to form discrete fingers 102. The shim 74 is likewise slit at 108 at circumferentially spaced locations therealong to form discrete fingers 106. The slits 104 and 108 are staggered in a circumferential direction relative to one another such that fingers 102 formed by the slits 104 of shim 72 overlie the slits 106 between the fingers 108 of the shim 74. Thus, the fingers 106 of shim 74 underlie the slits 104 of shim 72. The fingers 102 and 106 thus render the leg portion 90 of the supplemental seal 70 flexible, thereby affording an effective seal with the remote surface 88. The overlapping of the slits by the fingers also affords a sealing action inhibiting flow between the slits.

Figure 9:
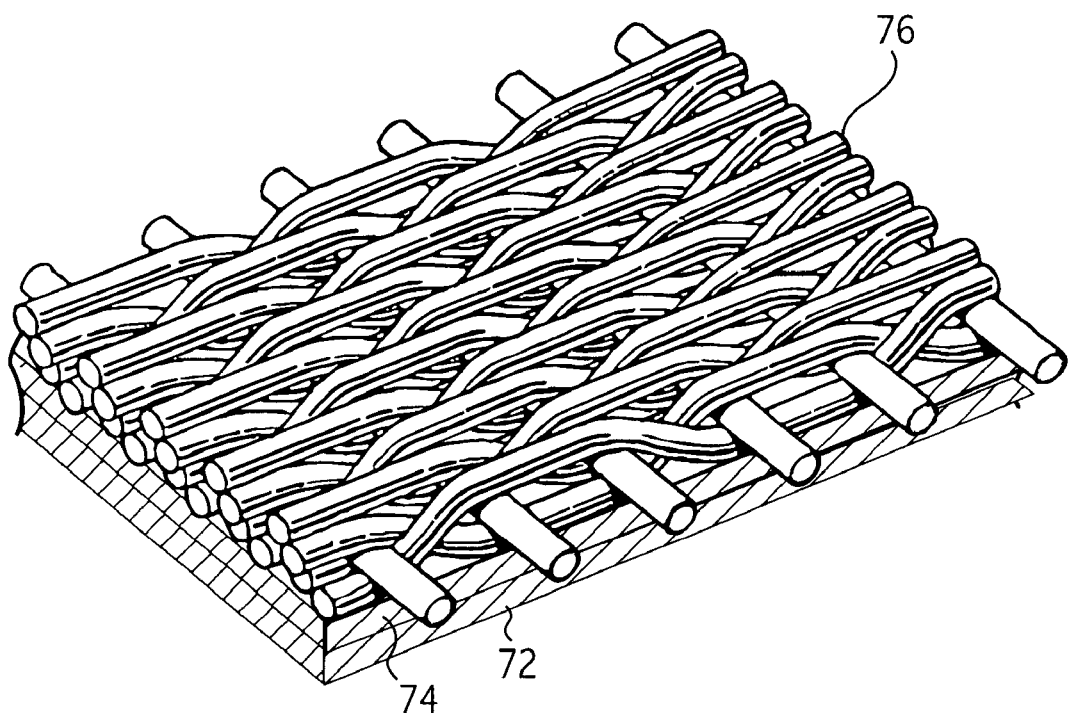
FIG. 9 is a perspective view of a metallic cloth weave for the supplemental seal hereof.

Referring to FIG. 9, there is illustrated a portion of a preferred metallic cloth 76 overlaying a shim, for example, shim 74. The cloth overlay is in the form of a Dutch twill weave. With the cloth formed of L605 or Haynes 188 material and with the relatively dense weave, effective seal and wear surfaces are provided.

The supplemental seal segments are provided preferably in circumferential lengths in excess of the circumferential length of nozzle segments. Consequently, the supplemental seal segments overlie the joints between the nozzle segments 41 and may butt endwise with or overlap one another, thereby to reduce nozzle inter-segment leakage as well as the leakage past the chordal hinge seals. It will be appreciated that the supplemental seals 70 are subjected to the high pressure of region 37. Seals 70 are thus biased into sealing engagement with the surface 88 of the inner rail 52 by the pressure differential on opposite sides thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
   a turbine nozzle support ring having a generally axially facing first surface;
   a turbine nozzle segment having at least one stator vane and a radially inwardly extending inner rail having a second surface in axial opposition to said first surface;
   a seal extending from said turbine nozzle support ring for sealing engagement along a side surface of said inner rail remote from said second surface for sealing between said support ring and said nozzle segment; and
   said seal including a seal segment having at least a first plate, an overlay of a woven metallic cloth and a distal margin covered by said cloth and engaging said remote side surfaced and wherein said inner rail has a projection extending axially therefrom for sealing engagement against said first surface and forming a second seal therewith.

2. A turbine according to claim 1 wherein said seal segment includes a second plate, said plates lying back-to-back with one another, said cloth extending as an overlay along opposite sides of said first and second plates.

3. A turbine according to claim 2 wherein said seal extends in an arcuate direction about an axis of the turbine, said plates having slits extending from edges thereof and along said margin to provide flexibility to said seal.

4. A turbine according to claim 3 wherein the slits along a margin of said first plate and the slits along a margin of said second plate are staggered relative to one another about the axis.

5. A turbine according to claim 1 wherein said projection extends linearly along said inner rail.

6. A turbine according to claim 5 wherein said sealing engagement between said projection and said first surface lies on a low pressure side of the first-mentioned seal.

7. A turbine according to claim 6 wherein the first seal extends in an arcuate direction about an axis of the turbine.

8. A turbine according to claim 1 including a support bracket extending generally radially outwardly from said support ring to support said seal segment on a side thereof remote from said inner rail, said margin of said seal segment being flexible and preloaded to seal against said remote side surface.

9. A turbine according to claim 8 wherein said first seal extends in an arcuate direction about an axis of the turbine, said support ring including an arcuate groove, and an edge of said bracket remote from said seal margin being disposed in said groove.

10. A turbine comprising:
    a turbine nozzle support ring having a generally axially facing first surface;
    a plurality of turbine nozzle segments each having at least one stator vane and a radially inwardly extending inner rail having a second surface in axial opposition to said first surface;
    a seal comprised of a plurality of seal segments extending from said nozzle support ring for sealing engagement along a side surface of said inner rail remote from said second surface; and
    each said seal segment including a first plate, an overlay of a woven metallic cloth and a distal margin covered by said cloth and engaging said remote side surface and wherein each said inner rail has a projection extending axially therefrom for sealing engagement against said first surface and forming a second seal therewith.

11. A turbine according to claim 10 wherein each said seal segment includes a second plate, said first and second plates of each said seal segment lying back-to-back with one another, said cloth extending as an overlay along opposite sides of said first and second plates.

12. A turbine according to claim 10 wherein each of said seal segments extends in an arcuate direction about an axis of the turbine and across an intersegment gap between said nozzle segments.

13. A turbine according to claim 10 wherein each said seal segment includes a second plate, said first and second plates of each said seal segment lying back-to-back with one another, said cloth extending as an overlay along opposite sides of said first and second plates, each said seal extending arcuately about an axis of the turbine, said plates having slits extending from edges thereof and along said margin to provide flexibility to said seal.

14. A turbine according to claim 13 wherein the slits along a margin of said first plate and the slits along a margin of said second plate in each seal segment are staggered relative to one another about the axis of the turbine.

15. A turbine according to claim 10 wherein said projections extend linearly along said inner rails.

16. A turbine according to claim 15 wherein said sealing engagement between said projections and said first surface lies on a low pressure side of the first-mentioned seal.

17. A turbine according to claim 10 including a plurality of support brackets extending generally radially outwardly of said support ring to support said seal segments on said support ring, said margins of said seal segments being flexible and preloaded to seal against said remote surface.

18. A turbine according to claim 17 wherein said seal segments extend in an arcuate direction about an axis of the turbine, said support ring including an arcuate groove, and an edge of each said bracket remote from said seal margin being disposed in said groove.

* * * * *

UNITED STATES PATENT AND TRADEMARK OFFICE
CERTIFICATE OF CORRECTION

PATENT NO. : 6,637,752 B2
DATED : October 28, 2003
INVENTOR(S) : Aksit et al.

It is certified that error appears in the above-identified patent and that said Letters Patent is hereby corrected as shown below:

<u>Column 5,</u>
Line 42, delete "surfaced" and insert -- surface; -- therefor.

Signed and Sealed this

Thirteenth Day of April, 2004

JON W. DUDAS
*Acting Director of the United States Patent and Trademark Office*